United States Patent [19]

Ostrowski et al.

[11] Patent Number: 4,819,991
[45] Date of Patent: Apr. 11, 1989

[54] WHEEL TRIM RETENTION SYSTEM

[75] Inventors: Norbert F. Ostrowski, New Boston; Larry N. Bouman, Canton; Heinrich J. Hempelmann, Livonia, all of Mich.

[73] Assignee: NI Industries, Inc., Novi, Mich.

[21] Appl. No.: 728,104

[22] Filed: Apr. 29, 1985

[51] Int. Cl.⁴ .............................................. B60B 7/06
[52] U.S. Cl. .............................. 301/37 SS; 301/37 SC
[58] Field of Search .......... 301/37 AT, 37 SS, 37 SC, 301/37 R

[56] References Cited

U.S. PATENT DOCUMENTS

| | | |
|---|---|---|
| 1,477,287 | 12/1923 | Sauzedde et al. |
| 2,106,586 | 1/1938 | Zerk |
| 2,109,684 | 3/1938 | Short |
| 2,118,596 | 5/1938 | Ferguson |
| 2,124,789 | 7/1938 | Lyon |
| 2,159,881 | 5/1939 | Booth ............... 301/37 SC |
| 2,175,353 | 10/1939 | Jacobi |
| 2,198,056 | 4/1940 | Lyon ............... 301/37 R |
| 2,217,775 | 10/1940 | Smith |
| 2,305,110 | 12/1942 | Schatzman |
| 2,328,301 | 8/1943 | Shaw, Jr. |
| 2,618,513 | 11/1952 | Horn ............... 301/37 R |
| 2,756,110 | 7/1956 | Lyon |
| 2,874,561 | 2/1959 | Alger |
| 2,911,260 | 11/1959 | Lyon |
| 2,971,798 | 2/1961 | Lyon, Jr. |
| 3,092,420 | 6/1963 | Baldwin et al. |
| 3,170,733 | 2/1965 | Lamme |
| 3,202,460 | 8/1965 | Holbrow |
| 3,480,329 | 11/1969 | Foster et al. ............... 301/37 R |
| 3,773,389 | 11/1973 | Foster et al. ............... 301/37 R |
| 4,061,400 | 12/1977 | D'Angelo ............... 301/37 SS X |
| 4,097,744 | 5/1978 | McCauley |
| 4,291,921 | 9/1981 | Wulf ............... 301/37 AT |
| 4,447,091 | 5/1984 | Nguyen et al. ............... 301/37 SS X |
| 4,576,415 | 3/1986 | Hempelmann ............... 301/37 S |

FOREIGN PATENT DOCUMENTS

| | | |
|---|---|---|
| 0149935 | 7/1985 | European Pat. Off. |
| 672204 | 12/1929 | France |
| 1263040 | 4/1961 | France |
| 526576 | 9/1940 | United Kingdom |
| 630176 | 10/1949 | United Kingdom |
| 793465 | 4/1958 | United Kingdom ............ 301/37 SC |
| 864129 | 3/1961 | United Kingdom |
| 1028861 | 5/1966 | United Kingdom |
| 2110610A | 6/1983 | United Kingdom |
| 2118491 | 11/1983 | United Kingdom ............ 301/37 SS |
| 2159778A | 12/1985 | United Kingdom |

OTHER PUBLICATIONS

No. 13,647; A.D. 1914, Jun. 5, Pugh's Complete Specification; 1 sheet.

Primary Examiner—Johnny D. Cherry
Assistant Examiner—Russell D. Stormer

[57] ABSTRACT

An improved wheel trim retention system which may incorporate anti-theft features is disclosed herein which incorporate both an easily fabricated assembly for effectively preventing relative rotation between the wheel trim and associated vehicle wheel as well as providing an improved arrangement for aiding in centering and spacing of the outer periphery from the adjacent vehicle wheel structure so as to avoid annoying rattling noises emanating therefrom. The spacer centering members are particularly suited to accommodate situations wherein a single wheel trim is intended to be fitted to vehicle wheels fabricated from either aluminum or steel and incorporates a multi-position centering spacer member which is adapted to engage the adjacent annular flange portion of the vehicle wheel which may be positioned at different distances from the trim member. A retaining clip member is also provided which operates to retain the centering spacer member in assembled relationship with the wheel trim as well as to provide a biasing action to maintain it in a desired set position. In order to prevent relative rotation between the wheel trim and associated vehicle wheel, a plurality of spring fingers are provided on the trim member, selected ones of which are designed to engage recessed portions provided on the associated lock bracket so as to prevent the relative rotation therebetween. The number of spring fingers and recesses provided are coordinated in such a manner as to assure any desired number of spring fingers will be seated within the recesses simultaneously and yet also enable a relatively small degree of indexing in order to seat adjacent spring fingers.

25 Claims, 4 Drawing Sheets

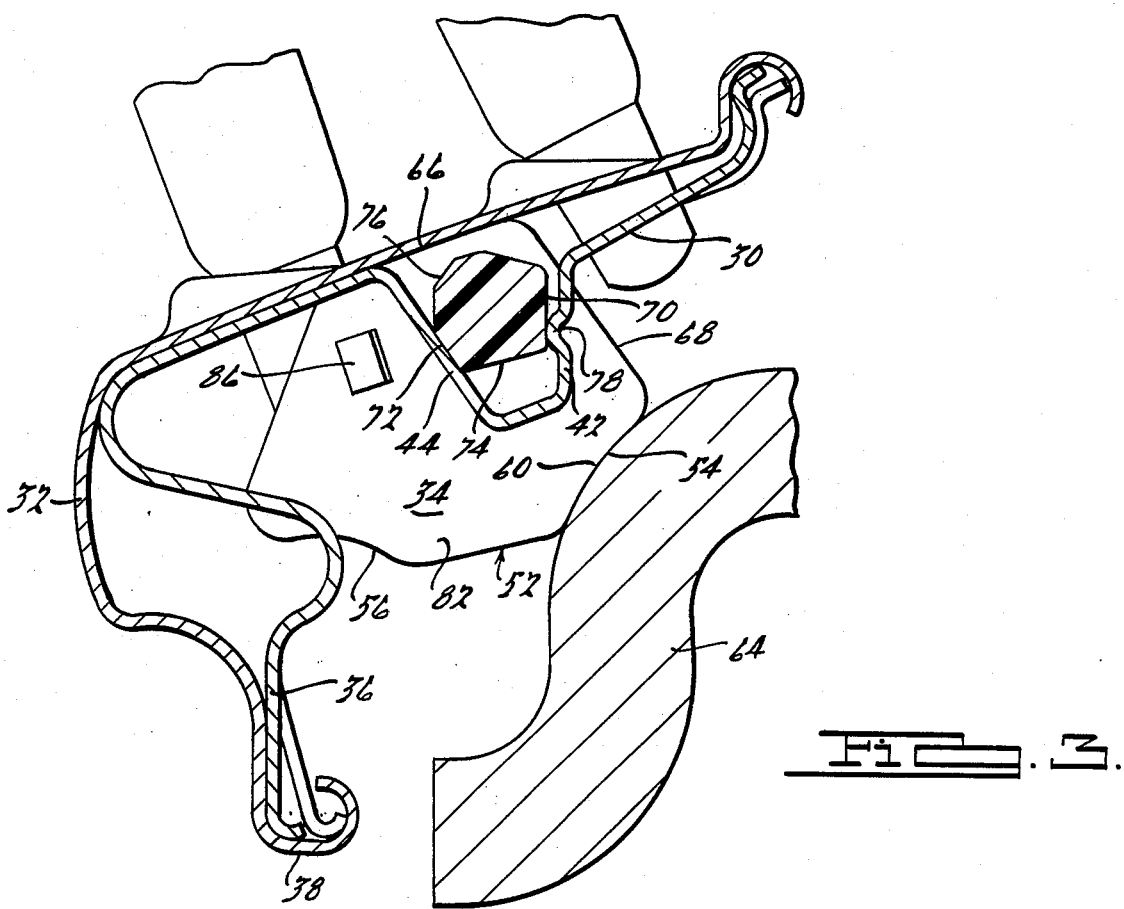
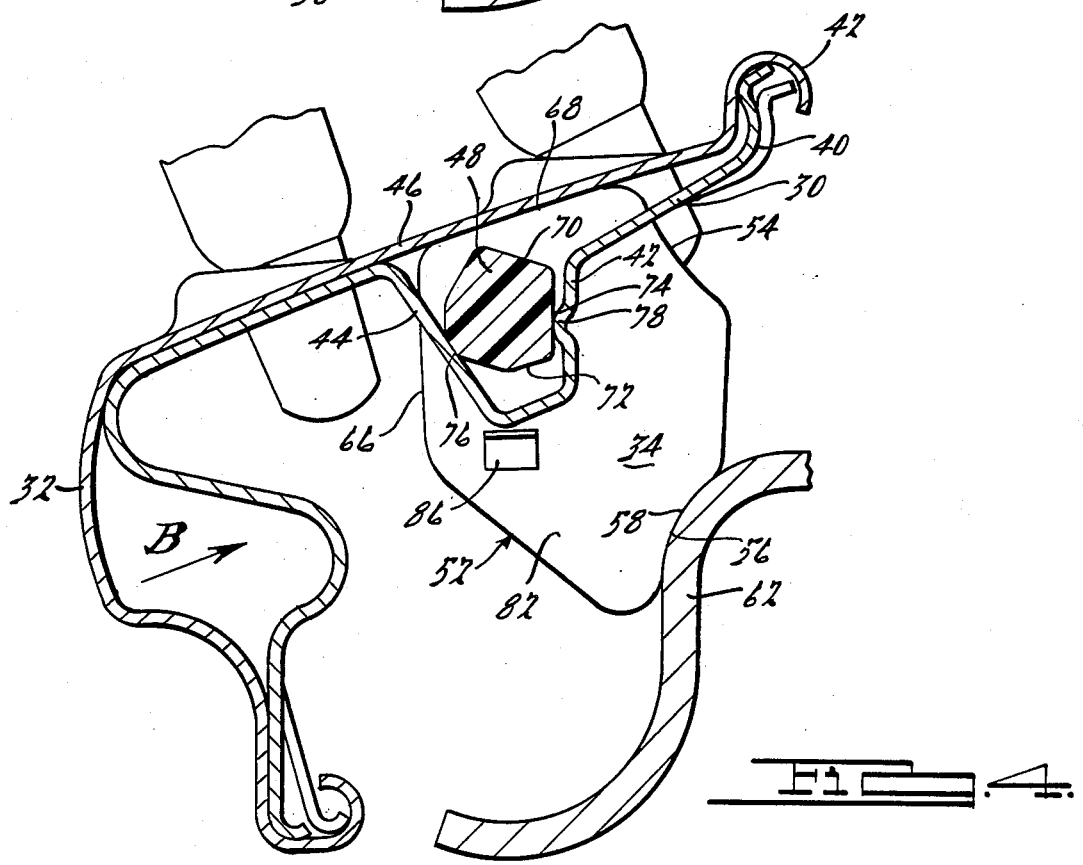

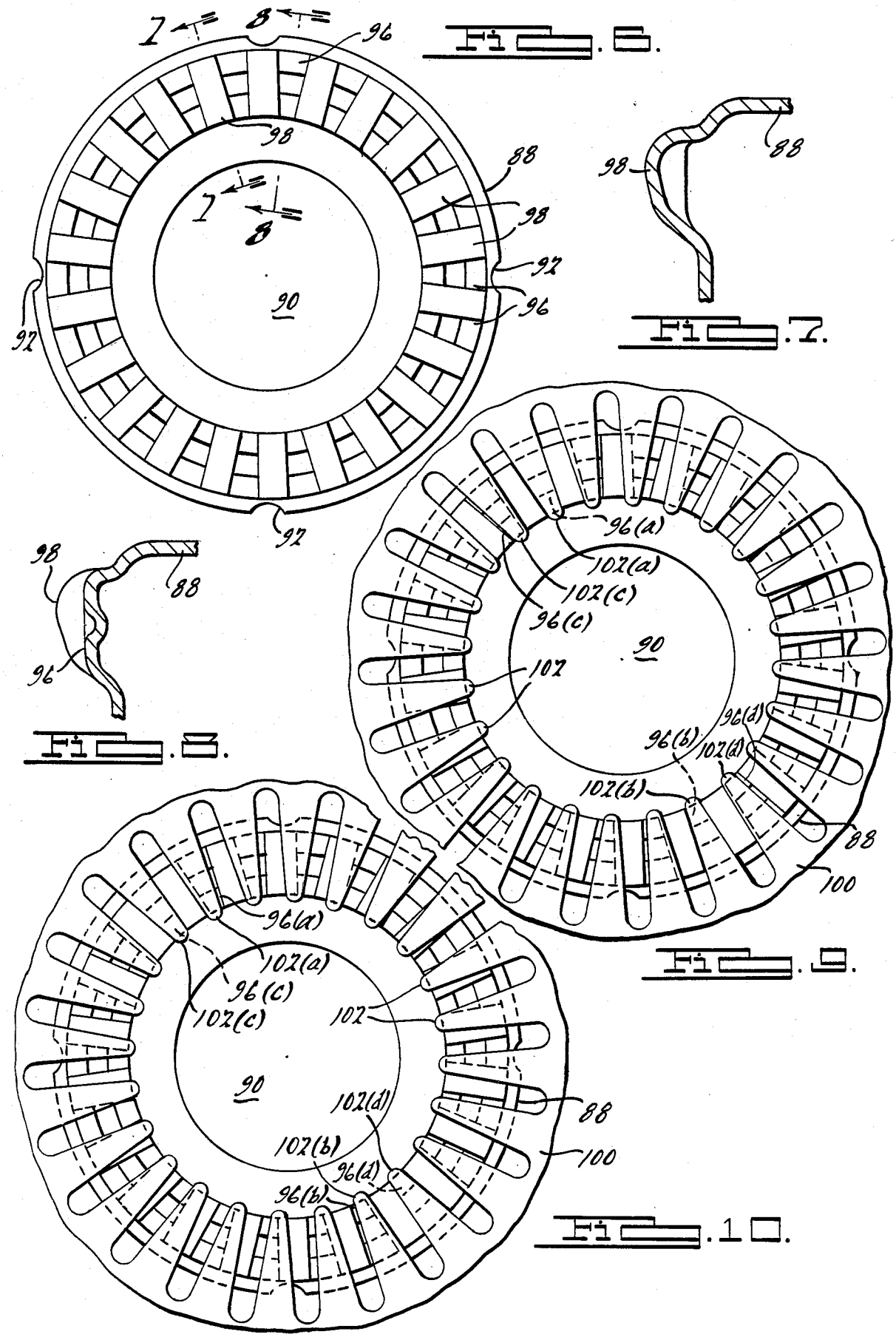

WHEEL TRIM RETENTION SYSTEM

BACKGROUND AND SUMMARY OF THE INVENTION

The present invention relates generally to wheel trim and more particularly to wheel trim retention systems of the center retention type.

Theft of wheel trim from motor vehicles has been a long recognized problem and the prior art is replete with various types of efforts to thwart this activity. One such approach to accomplishing this objective is to provide a central retention system which typically comprises a lock bracket which is secured to the axially outer surface of the vehicle wheel and includes fastening means which cooperate with associated fastening means provided on the wheel trim so as to secure the trim member to the vehicle wheel. Typically these fastening means may be in the form of threaded fasteners requiring the use of a specially coded wrench or the like in order to effect installation and removal thereof. In order to accommodate various design objectives and aesthetic appearances to be created by the wheel trim, it has been common practice to incorporate this fastening system at the center of the wheel trim. However, when such a retention system is incorporated in a location which is coaxial with the axis of rotation of the wheel trim, the problem of effectively inhibiting relative rotational movement between the wheel trim and associated vehicle wheel arises. In many of the prior art designs, separate biting clip members have been provided on the outer periphery of the wheel trim which clip members are designed to bitingly engage the generally axially extending flange portion of the vehicle wheel so as to effectively prevent relative rotational movement therebetween. While these clips are quite effective in preventing this relative rotation and may be acceptable for use when the wheel trim is to be fitted only on steel wheels, it is not acceptable when such wheel trim is intended to be used in conjunction with wheels fabricated from aluminum alloys which are much more prone to gouging as well as corrosion due thereto. Accordingly, in such applications, it is necessary to provide some means whereby this relative rotation between the wheel trim and associated vehicle wheel may be effectively prevented.

Compounding this objective of preventing relative rotation is the fact that the location of value stem holes relative to the lug nut pattern varies from wheel to wheel over a very wide range. When the wheel trim is in the form of a full wheel cover, it is necessary to provide an opening in the wheel trim to accommodate this valve stem. However, in such cases, it is necessary that the anti-rotation arrangement be structured in such a manner as to accommodate the varying location of this valve stem hole in the vehicle wheel and yet still provide a secure engagement to effectively prevent the relative rotation.

An additional problem is also encountered when the peripheral retention clips are eliminated in that the radially outer peripheral portions of the wheel trim are now left in an unsupported condition. If allowed to remain so, they may result in annoying rattling noise due to periodic engagement with the wheel rim itself. Compounding the problem of providing some peripheral support means for the wheel trim so as to prevent this rattling noise is the problem that the inner dimensions of steel wheels and aluminum wheels vary substantially therebetween due to the necessity to provide substantially greater metal wall thicknesses in the construction of aluminum wheels. While it is certainly possible to design individually dimensioned spacer means which are tailored to each of the dimensional relationships provided by steel and aluminum wheels, this results in the necessity to manufacture and stock a separate wheel trim suitable for each of the different material wheels.

The present invention, however, overcomes these problems and disadvantages in providing a center retention system for use with wheel trim which are intended to be used on both aluminum and steel wheels. The retention system of the present invention incorporates a two position centering spacer member which may be easily and readily adjusted to accommodate the dimensional relationships presented by either of the steel or aluminum wheels. Further, this centering spacer member is formed of a polymeric composition and thus avoids any likelihood of marring, scratching or gouging of the aluminum wheels nor is it subject to possible corrosion. Additionally, in order to overcome the relative rotation problems discussed above, a plurality of spring fingers are provided on the wheel trim, selected ones of which are designed to be received in selected ones of plurality of recesses provided on the center lock bracket and to cooperate therewith to prevent relative rotational movement. By carefully selecting the number of spring fingers provided on the wheel trim relative to the number of recesses provided on the lock bracket, it is possible to provide extremely small degrees of rotational indexing to seat successive ones of the spring fingers in the accommodating recesses. Thus, the wide tolerances allowed for the positioning of the valve hole with respect to the lug hole pattern on the vehicle wheel may be easily accommodated while still providing a secure and effective means for preventing the relative rotation between the wheel and associated wheel trim.

Additional advantages and features of the present invention will become apparent from the subsequent description and the appended claims taken in conjunction with the accompanying drawings.

BRIEF DESCRIPTION OF THE DRAWINGS

FIG. 3 is an enlarged fragmentary view of the portion of the wheel trim enclosed within the oval A of FIG. 2;

FIG. 4 is a view similar to that of FIG. 3 but illustrating the movable spacer in an alternate position all in accordance with the present invention;

FIG. 5 is a view of the retaining clip and associated rotatable spacer member shown in FIGS. 2, 3 and 4 as seen looking in the direction indicated by arrow B in FIG. 4;

FIG. 6 is a view of the anti-rotation retention cap as seen looking in an axially inward direction;

FIG. 7 is a fragmentary section view of the anti-rotation retention cap of FIG. 6, the section being taken along line 7—7 thereof;

FIG. 8 is a fragmentary section view of the anti-rotation retention cap shown in FIG. 6, the section being taken along line 8—8 thereof;

FIG. 9 is a fragmentary section view of the wheel trim illustrated in FIG. 2 showing the engagement between the anti-rotation spring member secured to the wheel trim and the anti-rotation retention cap forming a part of the lock bracket; and FIG. 10 is a view similar to that of FIG. 9 but illustrating the anti-rotation spring member rotationally shifted so as to place a next adjacent spring finger in engagement with a corresponding recess provided on the anti-rotation retention cap member.

DESCRIPTION OF THE PREFERRED EMBODIMENTS

Figure 1:
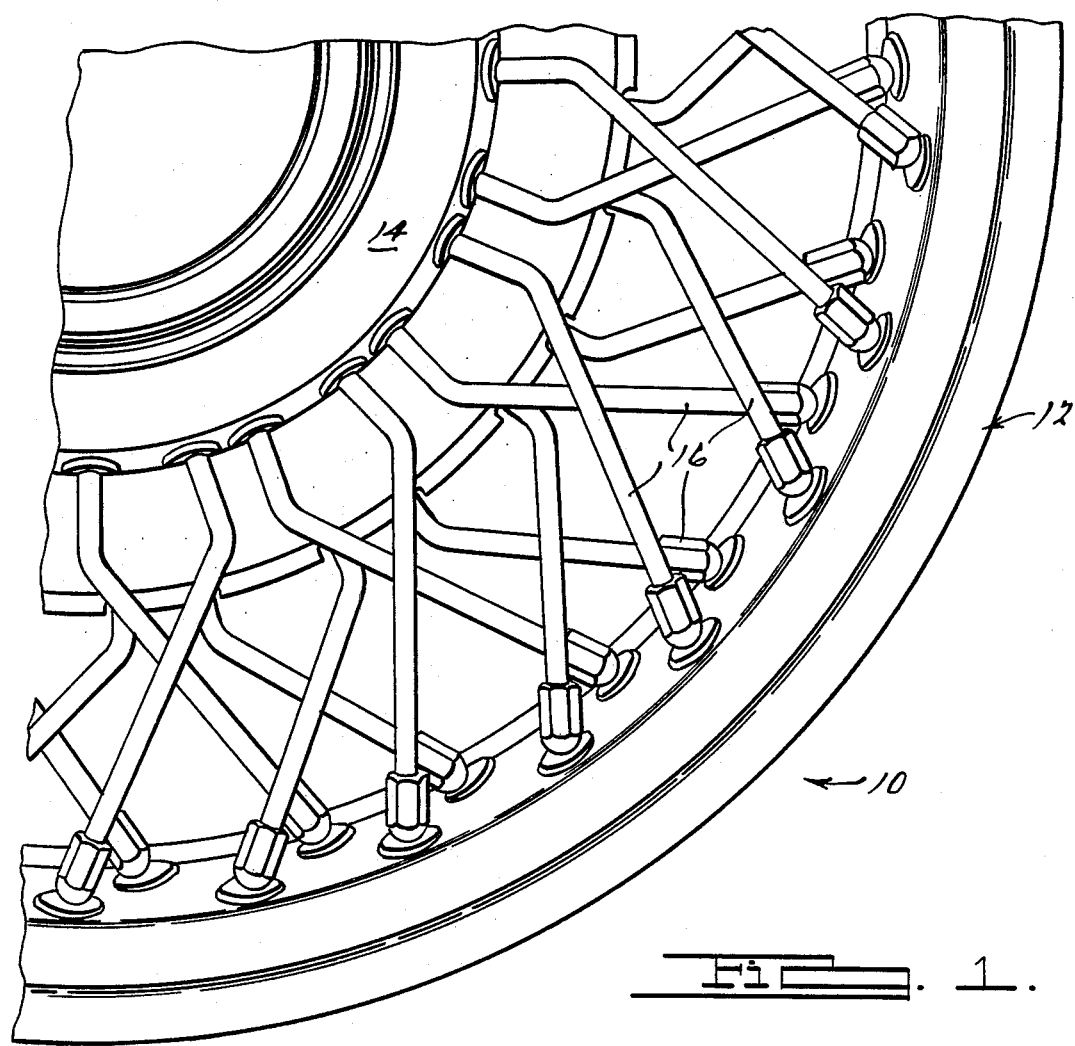
FIG. 1 is a fragmentary view of a simulated wire wheel trim in accordance with the present invention as seen locking in an axially inward direction.

Referring now to the drawings and in particular to FIG. 1, there is shown a wheel trim in accordance with the present invention indicated generally at 10. As shown, wheel trim 10 is in the form of a simulated wire wheel trim of the floating center type and includes an outer annular ring assembly 12 and inner central hub assembly 14 which are interconnected by a plurality of generally radially extending spoke members 16. As shown in a floating center type of simulated wire wheel trim, the sole support between the annular ring assembly 12 and central hub assembly 14 is provided by the spoke members 16, there being no interconnecting backing member provided therebetween.

Figure 2:
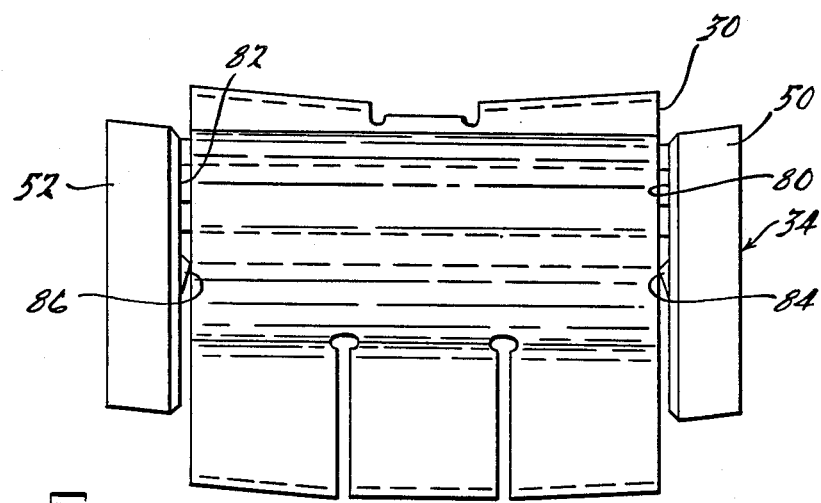
FIG. 2 is a fragmentary section view of the simulated wire wheel trim of FIG. 1, the section being taken along a radial plane extending parallel to the axis of rotation.
Figure 2:
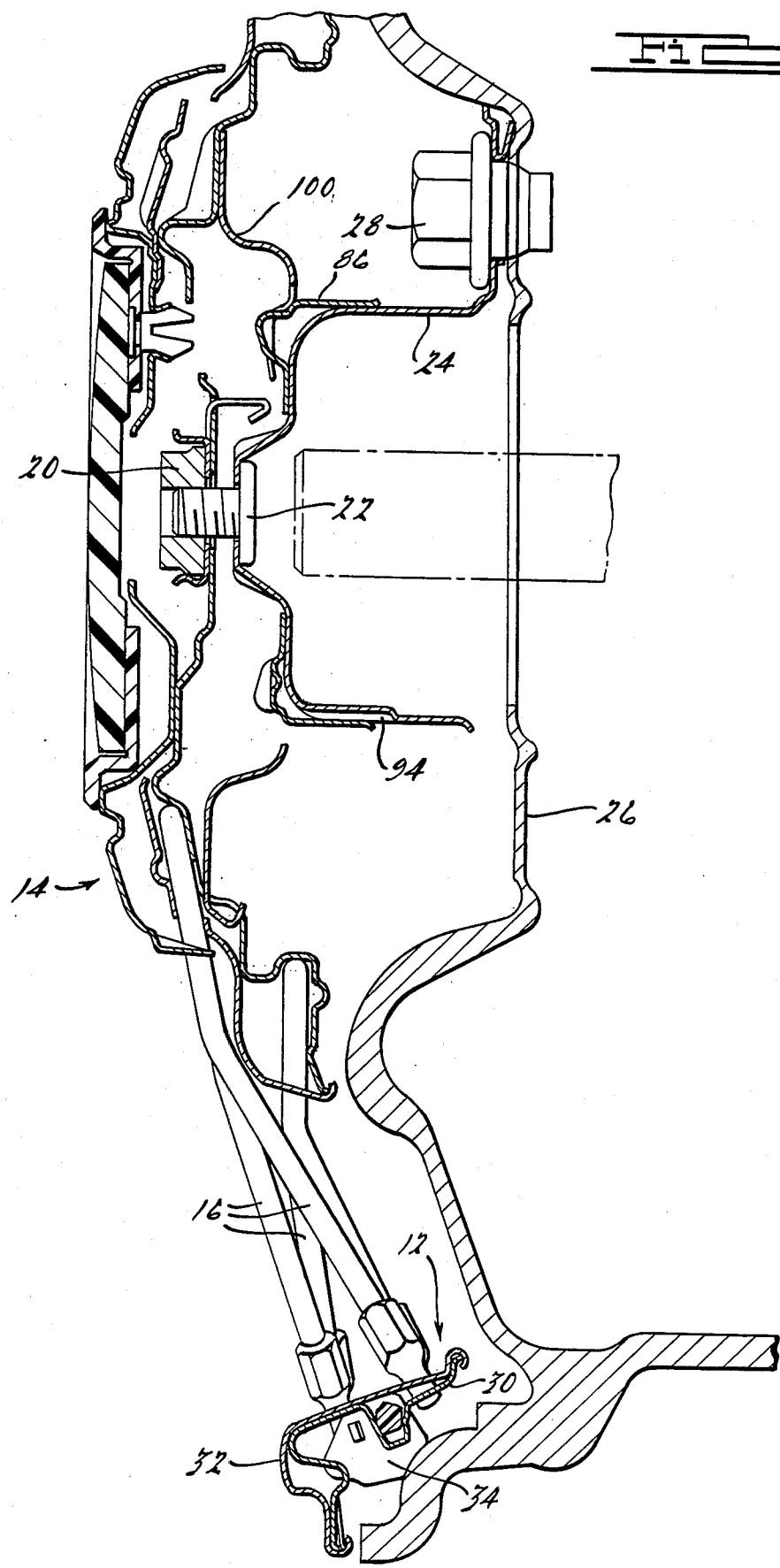

As best seen with reference to FIG. 2, simulated wire wheel trim 10 is adapted to be secured to a vehicle wheel by means of a center retention system 18 employing releasably engageable fastener members in the form of a nut 20 associated with the wheel trim 10 and a threaded stud or bolt 22 projecting axially outwardly from a lock bracket 24 which is secured to the vehicle wheel 26 by means of the wheel securing lug nuts 28. Nut 20 associated with the wheel trim 10 may incorporate anti-theft or theft deterrent means such as specially coded wrenches or the like should this be desired. In such center retention systems, the entire wheel trim 10 is retained in position on the vehicle wheel by means of the cooperative action of the threaded members 20, 22 and associated lock bracket 24 and hence there is no peripheral retention provided on the outer ring assembly 12. Such a center retention system is particularly desirable for use on wheels fabricated from aluminum alloys wherein it is important to avoid any biting or scraping engagement therewith which may remove the corrosion inhibiting surface layer therefrom or otherwise gouge or mar the surface thereof although the anti-theft features of the center retention system also make it desirable for use in conjunction with steel wheels. The particular center retention system illustrated herein is disclosed in greater detail in copending application Ser. No. 465,222, now U.S. Pat. No. 4,576,415 entitled "Wheel Trim Retention System" which is assigned to the same assignee as the present application and the disclosure of which is hereby incorporated by reference. Further, the construction of the floating center simulated wire wheel trim illustrated is disclosed in greater detail in copending application Ser. No. 688,328, now abandoned, entitled "Simulated Wire Wheel Trim" which is also assigned to the same assignee as the present application and the disclosure of which is also incorporated by reference. It should be noted, however, that while the present invention is being illustrated and described with reference to a floating center simulated wire wheel trim, it is equally well suited for other types of wheel trim.

In order to avoid potential for annoying noise resulting from rattling engagement between the periphery of the vehicle wheel 26 and the outer periphery of the trim member as well as to aid in the centering of the trim member on the vehicle wheel itself, it is desirable to provide some sort of centering spacer means on the outer annular ring assembly 12. However, because of the differences in relative strengths of steel and aluminum alloys, wheels fabricated from these materials have substantially different interior radial dimensions owing to the differences in the required wall thickness. Hence, it has not heretofore been possible to provide a single spacer centering means on this outer annular ring assembly 12 so as to enable a single trim to be fitted to either aluminum or steel wheels. However, the present invention overcomes this problem by providing a centering spacer member and associated retaining clip which is designed to be shiftable between alternate positions thereby rendering it suitable for use with both aluminum and steel wheels.

As best seen with reference to FIGS. 2 through 5, there is shown a retaining clip 30 of an irregular shape generally as shown which is designed to be secured to the outer annular ring member 32 and serves to retain a centering spacer member 34 thereon.

The retaining clip 30 includes a generally radially outwardly extending leg portion 36 which is designed to be received and retained within a radially outwardly projecting curled end portion 38 of the annular ring member 32. A second leg portion 40 is also provided extending generally axially inwardly with respect to the wheel trim and in radially inwardly spaced relationship to the radially outwardly extending leg portion 36 and is similarly received in and retained by an axially inner curled peripheral edge portion 42 of the annular ring member 32. Intermediate the ends of the clip 30 is provided a generally C-shaped reversely bent portion including axially inner and outer generally radially extending portions 42, 44 positioned radially outwardly from the generally radially inwardly extending flange portion 46 of the annular ring member 32 and defining a space therebetween within which is received an interconnecting portion 48 of the centering spacer member 34. As shown in FIGS. 2, 3, and 4, this space is sized relative to the cross sectional size and shape of the interconnecting portion 48 of the centering spacer member 34 so as to cooperate therewith to bias the centering spacer member 34 in a generally radially inward direction and into abutting engagement with the axially extending flange portion 46 of the annular ring member 32.

The centering spacer member 34 is preferably formed of a suitable polymeric material and comprises a pair of substantially identically shaped circumferentially spaced flange portions 50, 52 of substantial thickness in the circumferential direction and which are integrally formed with an elongated interconnecting member 48. As best seen with reference to FIGS. 3 and 4, the flange portions are each provided with a pair of spaced arcuate concave portions 54, 56 which are adapted to engage respective of the complimentarily shaped rounded shoulder portions 58, 60 of the steel and aluminum vehicle wheels 62, 64 respectively. Substantially planar surfaces 66, 68 are provided generally opposite each of these arcuate surfaces 54, 56 and are designed to abut against the inner surface of the generally axially inwardly extending flange portion 46 of the annular ring member 32. The interconnecting portion 48 of the spacer centering member 34 is also provided with two pairs of angularly positioned flats 70, 72 and 74, 76 which are positioned and designed to be engaged by axially outer portions 44 of the spring clip 30 and a generally axially outwardly projecting protrusion rib 78 formed on axially inner portion 42 of the spring clip 30. As shown in FIG. 3, when concave arcute surface portion 54 of spacer member 34 is in position to engage shoulder 60 of aluminum wheel 64, flats 70 and 72 are positioned to engage protrusion 78 and portion 44 of clip 30 respectively. Correspondingly, when arcuate concave surface portion 56 is in position to engage shoulder 58 of steel wheel 62, flats 74 and 76 are positioned to engage protrusion 78 and portion 44 of clip 30 respectively. Thus, these surfaces 70, 72 and 74, 76 cooperate with the flats 66, 68 provided on the outer flange portions 50, 52 so as to retain the spacer centering member 34 in a desired preset position with the appropriate arcuate concave portion 54, 56 positioned so as to engage the shoulder portion 58, 60 of a steel or aluminum vehicle wheel 62, 64. As shown in FIG. 5, the circumferential surfaces of flange portions 50 and 52 are inclined slightly relative to the axis of the spacer member 34 so as to accommodate the curvature of both the vehicle wheel shoulder as well as flange portion 46 of annular ring member 32.

As best seen with reference to FIG. 5, the inner opposed facing surfaces 80, 82 of respective flanges 50, 52 are each provided with a slight protrusion 84, 86 projecting outwardly therefrom. These protrusions 84, 86 are designed to snap over and thereafter overlie in spaced relationship the generally radially outer surface of spring clip 30 so as to aid in retaining spacer member in assembled relationship therewith during installation of spring clip 30 on annular ring member 32. As seen in FIGS. 3 and 4, protrusions 84 and 86 are positioned so as to avoid interference with the movement of spacer member 34 once spring clip 30 has been assembled to annular ring member 32.

When the spacer centering member 34 is in the position as illustrated in FIG. 3, it is apparent that the arcuate portion 54 provided on the flanges 50, 52 is positioned in relatively closely spaced relationship to the annular ring member 32 and in such a position as to be in engagement with the relatively thicker shoulder portion 60 of the aluminum vehicle wheel 64. However, should it be desired to fit the wheel trim 10 incorporating this spacer centering member 34 on steel vehicle wheel 62, the spacer centering member 34 may be easily rotated into the position as illustrated in FIG. 4 wherein the arcuate surface portion 56 thereof is positioned at a substantially greater distance from the annular ring member 32 forming a portion of the wheel trim 10. It should be noted that in both instances flats 66 and 68 provided on the outer flange portions 50, 52 of the spacer centering member 34 are in abutting engagement with flange portion 46 of the annular ring member 32. Further, as noted above, flats 70, 72 and 74, 76 provided on the interconnecting member 48 are engaged by selected portions 78 and 44 of the retaining spring clip member 30. Further, the configuration of the spring clip member is such that when it is desired to rotate the spacer centering member 34 from one position to the other, spring clip 30 will yield so as to allow the spacer centering member 34 to be easily rotated. However, once moved into the desired position, the biasing action exerted by the spring clip 30 will operate to retain the spacer centering member 34 in the desired position throughout repeated removal and reinstallation of the wheel trim member 10.

As thus may now be appreciated the present invention enables a single wheel trim to be fabricated and stocked which wheel trim may be easily fitted to either steel or aluminum wheels by merely repositioning of the spacer centering member. Further, because the spacer centering member is fabricated from a polymeric material, it will serve to not only aid in the centering of the wheel trim with respect to the vehicle wheel but further will operate to maintain the outer peripheral portion thereof in spaced relationship to the vehicle wheel to thereby avoid the possibility of annoying rattling noises being generated thereby.

It is noted that because the spacer centering member is fabricated from a polymeric composition and incorporates relatively smooth surfaces which are adapted to engage the vehicle wheel, it is not able to provide any substantial resistance to relative rotation between the wheel trim and the vehicle wheel. Accordingly, it is necessary to provide means to resist this relative rotation in conjunction with the center retention arrangement employed herein.

The present invention is designed to provide a secure anti-rotation arrangement which not only is well suited for preventing relative rotation between the wheel trim and vehicle wheel but is also adapted to enable the wheel trim to be positioned with respect to the vehicle wheel at relatively small rotational increments whereby variations in the positioning of the valve stem hole in the vehicle wheel relative to the lug bolt holes may be easily accommodated.

Accordingly, as best seen with reference to FIGS. 2 and 6 through 10, the anti-rotation system forming a part of the present invention includes an anti-rotation cup member 88 which is designed to be fitted to the lock bracket 24 which is adapted to be secured to the vehicle wheel. The anti-rotation cup member 88 comprises a generally cup-shaped extruded member having a relatively large diameter opening 90 in the bottom or axially outer end thereof through which the portion of the lock bracket 24 supporting the center threaded fastening member 22 may project. The inside diameter of the anti-rotation cup member 88 is sized to correspond to the outside diameter of the lock bracket 24 and a plurality of circumferentially spaced axially elongated indentations 92 are provided thereon which are designed to be interfitted or received in axially extending recesses 94 provided on the outer periphery of the lock bracket 24. An annular array comprising a plurality of alternating flats 96 and raised portions 98 are provided around the axially outwardly facing peripheral surface portion of the anti-rotation cup member 88 in substantially equally spaced relationship. The anti-rotation cup member 88 may be suitably secured to the lock bracket in any suitable manner such as for example by spot welding at a plurality of locations or alternately by means of a metal stitching process. Alternatively, of course, it may also be possible to form the alternating flats 96 and raised portions 98 provided on the anti-rotation cup member 88 integrally with the lock bracket itself thereby eliminating the need to separately fabricate the anti-rotation cup member 88.

The wheel trim 10 has secured thereto in any suitable manner at a suitable location a generally circularly shaped disc member 100. Disc member has a relatively large diameter central opening the outer periphery of which is defined by a plurality of substantially identical circumferentially spaced radially inwardly projecting spring fingers 102. Selected ones of these spring fingers 102 are designed to engage flats 96 positioned between adjacent raised portions 98 of the anti-rotation cup member 88 fitted to the lock bracket 24. Preferably the number and spacing of the spring fingers 102 relative to the number and spacing of flats 96 provided on the anti-rotation cup member 88 will be such as to enable two or more circumferentially spaced spring fingers 102 to simultaneously mate. As shown in FIGS. 9 and 10, the circumferential width of the spring fingers 102 will be only slightly less than the circumferential distance between adjacent raised portions 98 so as to facilitate seating of the selected spring fingers against flats 96 while also minimizing the play between the circumferentially opposite edges thereof and the adjacent sidewalls of the raised portions 98.

In a preferred embodiment it has been found that 24 spring fingers 102 coupled with 22 flats 96 provided on the anti-rotation cup member 88 will result in enabling the seating of two diametrically opposed spring fingers 102a and 102b with respective flats 96a and 96b of the anti-rotation cup 88 simultaneously as shown in FIG. 9. Further, it is noted that this arrangement requires only an indexing of the wheel trim relative to the vehicle wheel approximately 1.36 degrees before the next adjacent spring fingers 102c and 102d will seat in against the next adjacent flats 98c and 98d as shown in FIG. 10. The provision of this relatively small angular indexing in order to seat the respective adjacent spring fingers insures that substantially any location of the valve stem hole in the vehicle wheel will be easily accommodated by the valve stem hole in the wheel trim without requiring that the valve stem hole be made excessively large.

While the above described preferred arrangement is designed to position two diametrically opposed spring fingers and flats in engagement simultaneously and has been found to provide an effective resistance to relative rotation, the specific number of engagements may be varied as desired. Further, the relative numbers of fingers and flats provided may also be varied as desired in order to achieve different degrees of incremental indexing. Additionally, it should be noted that it is possible to provide for seating of a plurality of adjacent fingers by increasing the clearance resulting from the differences in relative widths of the flats and fingers.

As best seen with reference to FIG. 2, spring fingers 102 will preferably be positioned so as to project in a slightly axial inward direction and will engage the anti-rotation cup member 88 well before the wheel trim is fully secured to the lock bracket. Thus, as the nut 20 is tightened down, the spring fingers will resiliently deflect axially outwardly. When the wheel trim 10 is fully secured the natural resiliency of the spring fingers will retain them in secure engagement with the respective flats 98.

There is thus provided an improved center retention system for wheel trim which provides a relatively simple, easily fabricated and effective anti-rotation means which is well suited to accommodate the wide variation and location of valve stem holes provided in vehicle wheels. Further, the present invention enables a single wheel trim construction to be suitably sized for fitting on either aluminum or steel wheels and also eliminates the need for any anti-rotation clip engagement between the outer periphery of the trim and the vehicle wheel. As previously noted this is an important aspect particularly when such wheel trim are to be fitted to aluminum wheels as any scratching or marring of the surface thereof represents an invitation to undesirable corrosion of the wheel.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:
1. A wheel trim for a vehicle wheel comprising:
   a generally circular trim member having a decorative axially outwardly facing surface;
   a plurality of spring clips attached to the periphery of said trim member in circumferentially spaced relationship;
   spacer means associated with and retained on said trim member by said spring clips and including first and second discrete surfaces, said spacer means being movable so as to position one of said first and second discrete surfaces for engagement with a vehicle wheel as said wheel trim is assembled thereto so as to aid in centering of said trim member with respect to said vehicle wheel, said spring clips being positioned in spaced relationship to said vehicle wheel.

2. A wheel trim as set forth in claim 1 wherein said spacer means are movable between a first position and a second position whereby said spacer is operative to position portions of said wheel trim at different distances with respect to said vehicle wheel.

3. A wheel trim as set forth in claim 2 wherein said spring clips are operative to exert a biasing action on said spacer means so as to retain said spacer means in one of said first and second positions.

4. A wheel trim as set forth in claim 1 wherein said spacer means is formed from a polymeric material and is operative to inhibit noise generating engagement between said trim and said vehicle wheel.

5. A wheel trim as set forth in claim 1 wherein said spacer member includes a pair of spaced flange members and an interconnecting portion extending therebetween.

6. A wheel trim as set forth in claim 5 wherein said flange members are positioned adjacent laterally opposite sides of each of said spring clips, said spring clip exerting a biasing force on said interconnecting portion.

7. A wheel trim as set forth in claim 5 wherein said interconnecting portion includes a plurality of surfaces thereon coacting with engaged surface portions of said spring clip to retain and spacer means in a desired position.

8. A wheel trim as set forth in claim 7 wherein said spacer means are movable between a first position and a second position whereby said spacer is operative to position said wheel trim at different distances with respect to said vehicle wheel.

9. A wheel trim for a vehicle wheel comprising:
   a generally circular trim member having a decorative axially outwardly facing surface;
   a plurality of spring clips attached to the periphery of said trim member in circumferentially spaced relationship;
   spacer means associated with and retained on said trim member by said spring clips, said spacer means being engageable with a vehicle wheel as said wheel trim is assembled thereto so as to aid in centering of said trim member with respect to said vehicle wheel, said spring clips being positioned in spaced relationship to said vehicle wheel and said spacer means are movable between a first position and a second position whereby said spacer is operative to position portions of said wheel trim at different distances with respect to said vehicle wheel, said spring clips are operative to exert a biasing action on said spacer means so as to retain said spacer means in one of said first and second positions, each of said spacer means includes a pair of spaced arcuate surface portions engageable with a correspondingly shaped portion of said wheel to aid in centering of said trim and maintaining the peripheral portion of said trim in spaced relationship with respect to said wheel.

10. A wheel trim as set forth in claim 9 wherein said spacer means includes a pair of additional spaced surface portions, each of said additional spaced surface portions being positioned to abuttingly engage a portion of said trim member when said spacer means is positioned with a selected one of said arcuate surface portions engages said vehicle wheel, said additional surface portions thereby aiding in retaining said spacer means in said one of said first and second positions.

11. A wheel trim for a vehicle wheel comprising:
an ornamental trim member adapted to overlie the axially outer surface of a vehicle wheel;
retention means for securing said trim member to a vehicle wheel, said retention means including
a bracket member adapted to be secured to said vehicle wheel for supporting first fastening means thereon, and
second fastening means associated with said wheel trim, said first and second fastening means being releasably connectable to retain said trim member on said wheel; and
anti-rotation means for preventing relative rotation between said wheel trim and said vehicle wheel, said anti-rotation means including
a first annular array of axially facing alternating raised and depressed surfaces of a first predetermined number;
a second annular array of resilient radially extending circumferentially spaced fingers of a second predetermined number, said fingers being of a length to axially overlie said raised and depressed surfaces of said first array as said wheel trim is assembled to said vehicle wheel;
one of said first and second arrays being non-rotatably provided on said trim member and the other being non-rotatably secured to said vehicle wheel;
selected ones of said fingers being received between said raised surfaces as said wheel trim is assembled to said bracket member and cooperating therewith to effectively limit relative rotational movement between said trim member and an associated vehicle wheel, of said resilient fingers being deflected in an axial direction by said raised surfaces.

12. A wheel trim as set forth in claim 11 wherein said first and second predetermined numbers are unequal.

13. A wheel trim as set forth in claim 11 wherein said spring fingers are secured to said wheel trim and are positioned so as to engage said bracket member before said wheel trim is fully seated on said vehicle wheel whereby said spring fingers are biased into engagement with said bracket member.

14. A wheel trim as set forth in claim 11 wherein said annular array of said spring fingers are substantially equally circumferentially spaced.

15. A wheel trim as set forth in claim 11 wherein said annular array of alternating raised and depressed surfaces are formed on an anti-rotation member, said member being secured to said bracket member.

16. A wheel trim as set forth in claim 11 further comprising:
a plurality of spring clips attached to the periphery of said trim member in circumferentially spaced relationship;
spacer means associated with and retained on said trim member by said spring clips, said spacer means being engageable with a vehicle wheel as said wheel trim is assembled thereto so as to aid in centering of said trim member with respect to said vehicle wheel.

17. A wheel trim as set forth in claim 16 wherein said spacer means are movable between a first position and a second position whereby said spacer is operative to position said wheel trim at different distances with respect to said vehicle wheel.

18. A wheel trim as set forth in claim 17 wherein said spring clips are operative to exert a biasing action on said spacer means so as to retain said spacer means in one of said first and second positions.

19. A wheel trim as set forth in claim 18 wherein said spacer means includes a pair of spaced arcuate surface portions engageable with a correspondingly shaped portion of said wheel to aid in centering of said trim and maintaining the peripheral portion of said trim in spaced relationship with respect to said wheel.

20. A wheel trim as set forth in claim 19 wherein said spacer means includes a pair of additional spaced surface portions, each of said additional spaced surface portions being positioned to abuttingly engage a portion of said trim member when said spacer means is positioned with a selected one of said arcuate surface portions engages said vehicle wheel, said additional surface portions thereby aiding in retaining said spacer means in said one of said first and second positions.

21. A wheel trim as set forth in claim 16 wherein said spacer means is formed from a polymeric material and is operative to inhibit noise generating engagement between said trim and said vehicle wheel.

22. A wheel trim retention system for use in removably securing a wheel trim to a vehicle wheel, said wheel trim retention system comprising:
a trim member having first fastener means associated therewith;
a bracket member adapted to be secured to said vehicle wheel and having second fastener means associated therewith,
said first and second fastener means being releasably connectable to secure said trim member on said vehicle wheel;
spacer means movably secured to the outer periphery of said trim member in circumferentially spaced relationship, said spacer means being movable between first and second positions so as to engage said vehicle wheel to support the peripheral edge of said trim member in different spaced relationships thereto.

23. A wheel trim as set forth in claim 22 wherein said retention system further includes anti-rotation means for preventing relative rotation between said trim member and said vehicle wheel.

24. A wheel trim as set forth in claim 23 wherein said anti-rotation means comprise a plurality of circumferentially spaced spring fingers provided on said trim member, selected ones of said spring fingers being resiliently engageable with recesses provided on said bracket member to effectively inhibit relative rotation therebetween.

25. A wheel trim for a vehicle wheel comprising:
a generally circular trim member adapted to be secured in overlying relationship to the axially outwardly facing surface of said vehicle wheel; and
spacer means movably secured to the outer periphery of said trim member, said spacer means being movable between a first position wherein a first surface portion of said spacer is adapted to engage a portion of a vehicle wheel having a given inside diameter and a second position wherein a second surface portion of said spacer is adapted to engage a portion of a vehicle wheel having an inside diameter greater than said given inside diameter so as to aid in centering said trim member with respect thereto, said first and second surface portions being spaced from each other.

* * * * *